United States Patent Office 3,426,093
Patented Feb. 4, 1969

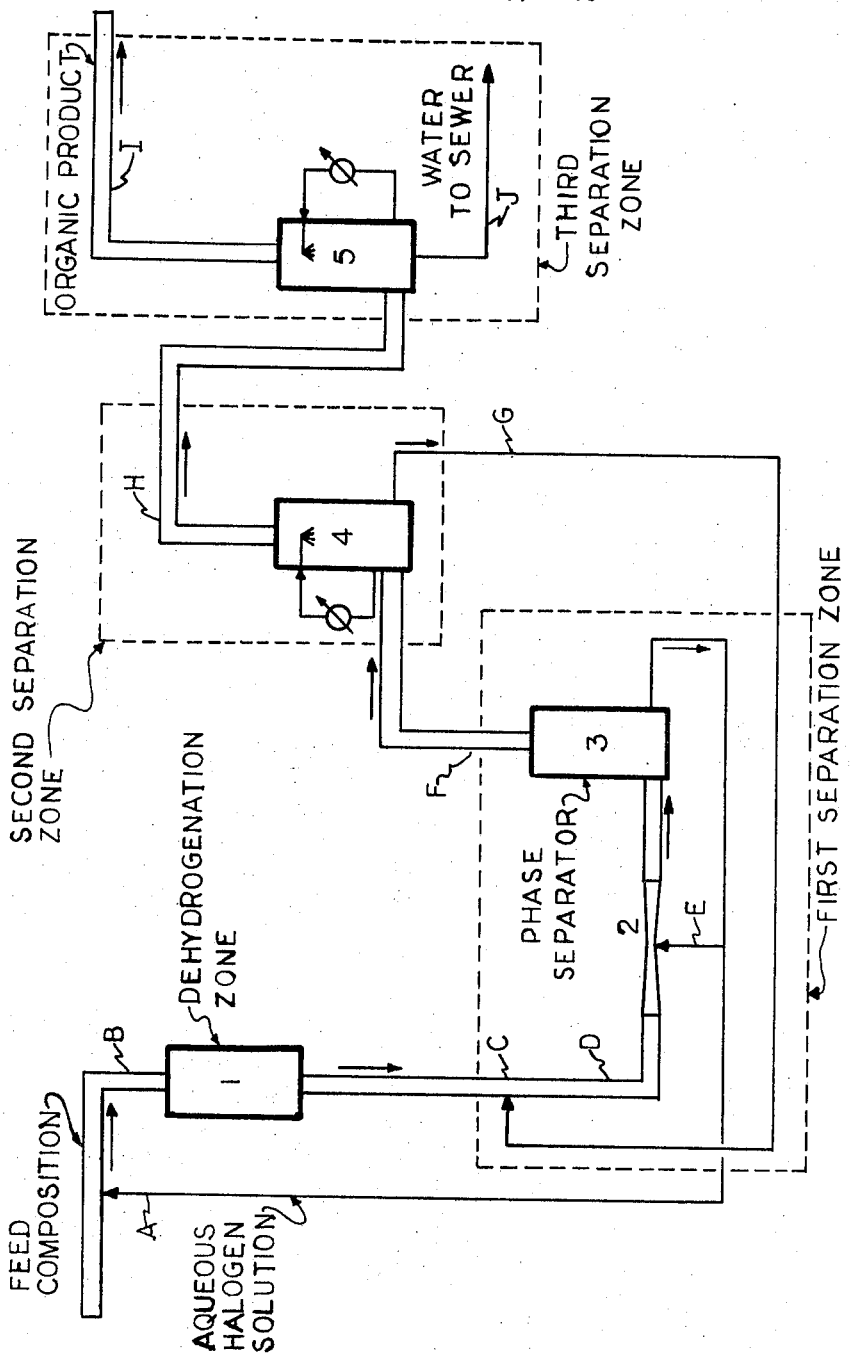

3,426,093
PROCESS OF DEHYDROGENATION
Olin C. Karkalits, Jr., and Clyde A. Leatherwood, Houston, Tex., assignors to Petro-Tex Chemical Corporation, Houston, Tex., a corporation of Delaware
Filed Mar. 5, 1963, Ser. No. 262,901
U.S. Cl. 260—680                                    10 Claims
Int. Cl. C07c *11/22, 7/00*

ABSTRACT OF THE DISCLOSURE

Process for the oxidative dehydrogenation of specified organic compounds wherein halogen is employed, and which includes an improved separation of halogen values from the dehydrogenation effluent.

---

This invention relates to a process for the preparation of unsaturated organic compounds. More particularly, it relates to an improvement in processes for the dehydrogenation of organic compounds with halogen.

Methods for the dehydrogenation of organic compounds, such as hydrocarbons with halogen have been disclosed in copending applications. According to these applications a mixture comprising the compound to be dehydrogenated and halogen are reacted at an elevated temperature. The effluent from the reactor contains the unsaturated product, halogen, and may contain various other components such as steam. The unsaturated organic procuct and the halogen must be separated from the other components of the gaseous effluent.

Several difficulties are encountered in the separation of the components of the gaseous effluent from the dehydrogenation zone. The recovery of a high percentage of the halogen is particularly difficult. One of the major obstacles is that the halogen is generally present as a relatively small percent of the reactor effluent. For example, the composition from which the halogen must be separated may contain only small quantities of halogen together with the organic phase and large quantities of water in the form of steam leaving the reactor and water added as quench water for the effluent. The halogen will then constitute a very minor percentage of the stream from which it is to be separated. From an economic standpoint, the percentage recovery of the halogen must be high even though it is present in such a minor amount.

One of the objects of this invention is to provide an improved process for the dehydrogenation of organic compounds with halogen. Another object of this invention is to provide an efficient process for the recovery of high percentages of the halogen from the dehydrogenation zone effluent. Another object of this invention is to provide a more efficient method for the removal of the halogen from the effluent without requiring excessive amounts of heat input. Still another object is to provide a process for the recovery of halogen which process has a low corrosive effect on the processing equipment. These and other objectives will be evident from the description which follows.

According to this invention these and other objects have been accomplished by a process which comprises (1) heating to effect dehydrogenation a particular mixture comprising an organic compound to be dehydrogenated, oxygen and an aqueous solution of halogen; (2) passing the dehydrogenation zone effluent to a first separation zone in which a critical amount of the inorganic halogen is removed in a particular aqueous solution of halogen from the effluent; (3) passing the remaining gaseous phase to a second separation zone in which a critical portion of the steam remaining in the vapor phase is condensed, and wherein a relatively larger proportion of the remaining inorganic halogen is removed in the condensate; (4) contacting the effluent as it leaves the dehydrogenation zone with the condensate of the second separation zone to cool the dehydrogenation zone effluent and to form the condensate of the first separation zone; (5) condensing the water in the vapor phase leaving the second separation zone in a third separation zone to form a third steam condensate and a gaseous organic phase; (6) separating the gaseous organic phase from the said third steam condensate, and (7) feeding the aqueous solution of inorganic halogen from step (2) to the dehydrogenation zone. The gaseous organic phase of step (6) may then be purified to obtain the unsaturated organic compound product.

The dehydrogenation zone contains the organic compound to be dehydrogenated, steam, oxygen and halogen at an elevated temperature. The halogen is introduced to the system by way of an aqueous solution of halogen of controlled concentration from a source described below. The effluent from the reactor contains the unsaturated organic product, generally some unconverted feed, steam, halogen and perhaps oxygen. The form in which the halogen appears will be somewhat dependent upon how the halogen was fed to the reactor. The inorganic halogen may be in the form of the acid such as hydrogen iodide, hydrogen bromide or hydrogen chloride; or it may be present as other types of compounds such as ammonium iodide or ammonium bromide, or it may be present as elemental halogen.

The effluent from the dehydrogenation zone will ordinarily contain from about 25 to 96 mol percent steam, and preferably will contain from about 50 to 95 mol percent steam. The organic phase including dehydrogenated product, any unreacted feed and any decomposition products will usually range from about 3 to 35 mol percent. The inorganic halogen will usually range from about $1 \times 10^{-5}$ to 25 mol percent and more often will be less than 5 or 10 mol percent of the effluent. The effluent will be at a temperature of at least 400° C. and generally will be at a temperature of at least 450° C., such as from 450° C. to 1000° C.

The effluent from the dehydrogenation zone is passed to the first separation zone where a minor amount of the steam in the effluent leaving the dehydrogenation zone is separated into a liquid phase from the gas phase by condensation of some of the steam. Also in this first zone a major proportion of the inorganic halogen is separated from the gas phase and dissolved in the water formed by the condensation of the steam. The conditions are so regulated in this first zone in order that the steam condensed in this zone together with the halogen removed from the gaseous phase are combined to form an aqueous solution of 10 to 50 weight percent inorganic halogen, and preferably from about 10 to 45 weight percent halogen based on the total weight of solution. If solutions containing higher concentrations of halogen are separated, such as those containing elemental halogen or inorganic halogen compounds in an amount as high or higher than the constant boiling mixture, then extremely corrosive compositions will result such as those containing $HI_3$. Therefore, the halogen should be present in an amount of no greater than, and preferably less than, the constant boiling aqueous mixture. This aqueous halogen solution containing from 10 to 50 weight percent inorganic halogen may then be fed directly to the dehydrogenation zone as a source of halogen. It is one of the advantages of this invention that no further processing of this stream is necessary, and that it may be recycled directly to the dehydrogenation zone. In the first separation zone from about 50 or 60 to 99 mol percent of the inorganic halogen is separated from the gaseous phase.

The objects of the first separation zone, including the separation of the major proportion of the halogen from the gaseous phase and the formation of an aqueous solution of from 10 to 45 or 50 weight percent inorganic halogen are accomplished in part by contacting the hot dehydrogenation zone effluent with the condensate from the second separation zone described below. When the effluent is quenched with the condensate from the second separation zone some steam is formed by vaporization and this steam produced further reduces the concentration of the halogen in the gases. However, according to this invention, this additional steam may be removed from the system as condensate from the second separation zone.

In the first separation zone ordinarily it is advisable to further contact the effluent gases with a scrubbing liquid after the initial quenching step. This additional treating of the gases may be necessary in order to remove the required amount of at least 60 mol percent of the inorganic halogen in the first separation zone. A preferred method for this scrubbing of the gases is to use the condensate from the first separation zone as the scrubbing liquid. That is, the condensate from the first separation zone is recycled to the same zone as a scrubbing liquid. This condensate is the aqueous halogen solution of from 10 to 45 weight percent halogen produced in the first separation zone. Another source of scrubbing liquid would be a portion of the condensate from the second separation zone. For instance, a portion of the condensate from the second separation zone could be used for the initial contacting of the dehydrogenation zone effluent and the remainder used as the scrubbing liquid, either alone or together with some recycled condensate.

The gases may be scrubbed such as in a packed or other type tower. However, a preferred method of scrubbing the gases is by contacting the gases with the scrubbing liquid in a pressure drop zone as disclosed in co-pending application Ser. No. 262,902 entitled, "Preparation of Unsaturated Compounds," and filed on even date. According to the described process, the quenched effluent gases are conducted to a pressure drop zone. The pressure drop zone comprises a duct or conduit through which the gases pass. The inlet section of the pressure drop zone is a contraction area wherein the conduit becomes smaller in cross-sectional area. The gases are forced through this contraction area to the point of greatest restriction in the conduit, which is the throat of the pressure drop zone. By forcing the gases through the more restricted portion of the pressure drop zone, the velocity of the gases is accelerated. While the gases are at an accelerated velocity, they are contacted with the contacting liquid. The contacted gases are then allowed to expand and decelerate by passing through an expansion section which is a section of the conduit which is of increased cross sectional area. There will be a certain amount of energy expended in the pressure drop zone. This energy loss may be measured by the pressure drop across the pressure drop zone, and will be such as at least 25 inches of water pressure drop. The expanded gases will then contain a liquid aqueous phase which contains the removed halogen. The liquid phase may be separated from the gaseous phase by a liquid-gas separator.

In the first separation zone, regardless of the method employed for the separation of the halogen from the gas phase, this major portion of the inorganic halogen is dissolved in, and remains in, the steam condensate. In this first separation zone, from 60 to 99 mol percent of the total inorganic halogen in the effluent leaving the dehydrogenation zone is removed from the gas phase. However, the minimum amount of inorganic halogen separated from the gas phase is normally much higher, such as at least about 90 mol percent and preferably at least about 95 mol percent of the total inorganic halogen in the effluent leaving the dehydrogenation zone. The amount of steam condensed in this first separation zone will be equivalent to less than 25 mol percent of the total steam in the effluent leaving the dehydrogenation zone. Usually the amount of steam condensed will be between about 0.1 and 15 or 25 mol percent of the steam contained in the effluent as it leaves the reactor. The effluent leaving the dehydrogenation zone includes as steam any steam or liquid water fed to the dehydrogenation zone and any steam that may be formed in the dehydrogenation zone. Not included in these percentages is any steam formed after the effluent leaves the reactor such as when the reactor effluent is quenched with the condensate from the second separation zone. References, in the description of the process and in the claims, to the steam in the effluent leaving the dehydrogenation zone refer only to the steam present in the effluent immediately as the effluent leaves the dehydrogenation zone prior to any quenching. At any rate, an amount of steam is condensed in the first separation zone to provide a liquid phase halogen solution of about 10 to 45 weight percent inorganic halogen based on the total weight of solution. Better results are obtained when the concentration of halogen in this solution is within the range of about 15 to 45 weight percent inorganic halogen based on the total weight of the solution. Therefore, in the first separation step a large portion of the inorganic halogen is separated from the gas phase of the reactor effluent together with equivalent to a minor portion of the water contained in the effluent from the dehydrogenation zone to provide the aqueous solution of halogen.

The condensate from the first separation zone is an aqueous solution of halogen which can be directly returned to the dehydrogenation zone. The solution may be returned to the dehydrogenation zone by any convenient method such as by adding it directly to the dehydrogenation zone or by adding it to the organic compound to be dehydrogenated prior to the dehydrogenation zone. The concentration of the halogen in this solution may be varied somewhat by evaporation of excess water or by the incorporation of an additional amount of halogen prior to introduction of the solution into the dehydrogenation zone or into the stream being introduced into the dehydrogenation zone. Preferably the condensate from the first separation zone will be at a concentration of or about the concentration of the aqueous solution being fed to the stream introduced into the dehydrogenation zone. It is a significant advantage of this invention that this aqueous solution of halogen obtained from the first separation zone may be returned directly to the dehydrogenation zone without any further processing such as separating the water or converting the halogen compounds to elemental halogen. It is also an advantage of this invention that this aqueous solution of halogen constitutes a minor proportion of the total feed to the dehydrogenation zone and as a result only a relatively small amount of heat must be used to heat the halogen solution to the temperature of the dehydrogenation zone. Also because the solution constitutes a relatively small volume, the equipment needed to handle this solution is correspondingly reduced. This last feature is particularly important because halogen solutions are corrosive and the amount of costly corrosion resistant equipment may be reduced. An additional advantage is that the halogen solution may be brought to the dehydrogenation temperature after it has been diluted with the other components in the mixture fed to, or in, the dehydrogenation zone. For example, the halogen solution may be added directly to the dehydrogenation zone and as a result the halogen is diluted with the other components when it is heated, thus reducing corrosion.

The last step in the first separation zone is to separate the condensed aqueous liquid solution of halogen from the remaining vapor phase. This step may be accomplished by any means for the separation of liquids from gases such as by a knock-out drum.

The gaseous phase leaving the first separation zone contains a large amount of water in the gaseous phase including some of the steam contained in the dehydrogenation zone effluent and some steam produced by the quenching operation. The gaseous phase also contains the halogen not removed in the first separation zone. The weight percent halogen based on the total gaseous stream entering the second separation zone may be such as from about $1 \times 10^{-5}$ to 10 mol percent halogen based on the total composition and may suitably be less than 5 mol percent, such as less than 2 mol percent. A typical gaseous composition entering the second separation zone would have from about 30 to 95 mol percent water and from 1 to 60 mol percent organic phase and may suitably be at a temperature of about 50° C. to 150° C. Gases such as nitrogen or oxygen may also be present.

Even though the halogen constitutes a minor proportion of the gaseous phase entering the second separation zone, on a cost basis this amount of halogen represents a considerable item and a large percent should be recovered.

A second portion of the steam is condensed in the second separation zone. It has been found that the condensate produced in this separation zone contains a disproportionate amount of the halogen present in the gaseous phase. For example, if 50 percent of the steam is condensed, the condensate will contain greater than 50 percent of the remaining halogen. In this separation zone, about 10 to 75 or 80 percent of the steam coming into the second separation zone is condensed. This condensate contains from about 30 to 99 mol percent of the total halogen entering the second separation zone. The ratio of the mol percent halogen recovered in the condensate of this step is at least 10 percent greater than the mol percent of the steam condensed in this separation step and will usually be at least 20 percent greater. The concentration of the halogen in the condensate will be from about 0.001 to 5.0 or 10 weight percent halogen based on the total weight of the condensate. This condensate is used as the cooling means for the first separation zone, as by using this condensate for the initial contact of the dehydrogenation zone effluent. The condensate of the second separation zone as it leaves the zone will usually be at a temperature between about 70° C. and 115° C., and may be used as such or cooled by conventional means prior to use as a cooling media for the first separation zone. Normally the condensate of the second separation zone will be at a temperature of 25 to 115° C. when it is used to contact the dehydrogenation zone effluent in the first separation zone. The apparatus used in the second separation zone to condense the portion of the steam may be one of a variety of types for cooling gaseous liquids. One or more pieces of apparatus may be used for this condensation. Useful devices include such as packed scrubbing towers, tube type condensers, towers equipped with bubble cap trays or open spray towers. A portion of the condensate may be recycled to the sprays at the top of the tower to produce additional condensate. If the condensate is used as the spray water, normally a cooler will be required in the line from the bottom of the tower to the sprays.

By regulating the temperature and the amount of condensate obtained in the second separation zone, the amount of condensate is about equal to the amount of cooling medium needed to cool the dehydrogenation zone effluent in the first separation step. By such a scheme, a relatively high percent of the halogen entering the second separation zone is recovered and recycled to the system. Therefore this dilute composition of halogen entering the second separation zone does not have to be distilled to recover the halogen. Not only is a high percentage of the halogen recovered in an economical way, but also the amount of water contained in the system is maintained in balance.

The vapor phase leaving the second separation zone contains the organic phase together with the uncondensed steam and perhaps a minute quantity of halogen. For example, the vapor phase leaving the second separation zone may comprise from about 35 to 95 mol percent water in all forms, from 1 to 60 mol percent organic phase and less than 5 mol percent halogen, and preferably less than 2 mol percent halogen. The organic phase may be separated from the aqueous phase in a third separation step wherein the remainder of the steam is condensed. Because the condensate from the third separation step contains only a small quantity of halogen, this condensate may be discarded and this excess water consequently removed from the system.

Example 1

A detailed example of one of the preferred methods of operation according to this invention is illustrated in the drawing. The invention will be illustrated by describing the dehydrogenation of n-butene-2 to butadiene using ammonium bromide as the halogen catalyst. All flow rates are calculated at 60° F.

The aqueous solution of the halogen A is a solution containing approximately 35 weight percent of ammonium bromide based on the total weight of ammonium bromide and the water. On a molar basis this catalyst solution A was fed at a rate of about 3.3 mols of water per hour and 0.324 mol of ammonium bromide per hour. This mixture at a temperature of about 106° C. and at a pressure of about 60 p.s.i.g. was fed to the mixture of steam and butene at a rate of about 0.15 gallon per minute. The water contained in the ammonium bromide solution was vaporized by the heat of the other components of the feed. The composition B entering the dehydrogenation zone reactor 1 comprised 17.45 mol percent nitrogen, 4.64 mol percent oxygen, 6.63 mol percent n-butene-2, 0.26 mol percent ammonium bromide, and 69.59 mol percent water as steam, with the remainder being aliphatic hydrocarbons such as isobutene, isobutane, n-butane and n-pentane. The feed rate in mols per hour of each component was 21.31 nitrogen, 5.66 oxygen, 8.09 n-butene-2, 0.323 ammonium bromide and 85.0 steam. The dehydrogenation zone comprised a fixed bed reactor packed with ferric oxide catalyst pellets. The inlet temperature at the top of the dehydrogenation zone was about 500° C., and the inlet pressure was about 10.0 p.s.i.g. In the reactor a high percentage of the butene was dehydrogenated to butadiene. In the reactor about 8 mols per hour of additional steam were formed in the reactor by the reaction of oxygen with oxygen. Therefore, immediately as it left the reactor, the reactor effluent contained 93.0 mols of steam per hour. The hot exit gases were contacted at C with the condensate from the second separation zone. The temperature of the contacting water C was about 93° C. and is fed by spray nozzles to the effluent from the dehydrogenation reactor at a rate of about 3.19 gallons per minute, or 88.6 mols per hour of water. This contacting solution contained about 0.1 or 0.2 mol percent ammonium bromide, with the remainder being water. Most of the contacting water was converted to steam during the contacting operation. The cooled reactor effluent D contained roughly 181.6 mols per hour of water with most of the water being in the form of steam. The cooled gases were then scrubbed by a pressure drop scrubbing apparatus represented at 2. The pressure drop zone of the scrubbing apparatus consisted of a contraction section which was a cone shaped conduit which was smoothly tapered down to the throat. The throat of the pressure drop zone was cylindrical in shape and the scrubbing liquid was added to the throat through nozzles. The scrubbing liquid E is of the same composition as described for A. The rate of feed of this scrubbing liquor was about 26.0 gallons per minute and the temperature of this scrubbing liquid was about 106° C. The scrubbed gases were then allowed to expand in an expansion section which was a smoothly tapered cone shaped section which was tapered outwardly from the throat. The pressure drop across the scrubbing apparatus was about 60 inches of water. Both the catalyst solution A and the scrubber liquid E are obtained from the bottom of the phase separator 3. The exit gases from the scrubbing apparatus were then fed to the phase separator 3. In the phase separator the condensed portion of the steam condensate was separated from the remaining gaseous phase containing organic compounds, steam and ammonium bromide. The described first separation zone encompassed the contacting operation C, scrubber operation 2 and phase separation operation 3, that is, the processes from the point the exit gases leave the reactor to the point F constituted the first separation zone. As mentioned, in the first separation zone most of the contacting water was vaporized into steam at C. In this first separation zone about 3.3 mols of steam per hour were condensed, which is the same amount of water that was fed to the inlet gases to the reactor by way of the catalyst solution A. Greater than 85 mol percent of the total inorganic bromine leaving the reactor was removed in the first separation zone and returned to the reactor by the solution A. The gaseous phase F containing about 178.3 mols of steam per hour was then conducted to the second separation zone which was a condenser 4. Less than 10 mol percent of the total bromine leaving the dehydrogenation zone remained in the gases F fed to the second separation zone. The condenser 4 was a packed tower with the temperature of the condensate at the bottom of the tower being about 96° C. and the temperature of the overhead being about 94° C. As shown, the condensate formed in 4 was recycled through a cooler to the sprays at the top of the tower. The temperature of the spray water was 50° C. The spray tower was operated at about atmospheric pressure. In the condenser 4 approximately 49.6 mol percent, or 88.6 mols, of the 178.3 mols of steam entering the condenser 4 was condensed. This condensate contained approximately 70 mol percent of the bromine entering the condenser 4. The bromine was recovered by feeding the condensate G as the quench for the reactor effluent at C, as previously mentioned. The composition of the exit gases H in terms of mols per hour was 21.31 nitrogen, 0.76 oxygen, 6.45 butadiene-1,3, 1.21 n-butene-2, 89.65 water as steam, bromine compounds equivalent to 0.0087 mol of elemental bromine, with the remainder being various aliphatic hydrocarbons and oxygenated compounds. The gaseous overhead H was then conducted to the third separation zone 5 which was also a packed tower. The temperature of the overhead I was about 43° C. In this separation zone essentially all of the remaining steam was condensed and the condensate J was sewered. The spray water for the second tower was obtained by recycling the condensate through a cooler as shown. The overhead product contained in terms of mols per hour 21.31 nitrogen, 0.76 oxygen, 6.36 butadiene-1,3, 1.21 n-butene-2, and 2.80 steam with the remaining being essentially aliphatic hydrocarbons, oxygen and oxidation products. The gaseous phase I was then purified to separate the butadiene product from the remaining aliphatic hydrocarbons.

Example 2

The general procedure of Example 1 was repeated with the major exceptions being (1) hydrogen iodide was used instead of ammonium bromide and (2) the pressure drop scrubbing apparatus was replaced with a scrubbing tower. The scrubbing tower consisted of five sieve trays 24 inches in diameter on 18 inch tray spacing. Each tray had 240 ³⁄₁₆ inch holes. The depth of aqueous halogen solution on each tray was about 2½ inches.

Butene-2 was dehydrogenated to butadiene-1,3 in a reactor packed with ¼ x ¼ inch 316 stainless steel Raschig Rings. The liquid hourly space velocity was 1.0, the iodine to butene mol ratio was 0.031 (calculated as $I_2$), the oxygen to butene ratio was 0.70 and the inlet steam to butene ratio was 13 to 1. The maximum temperature in the reactor was 700° C. The yield of butadiene in the effluent was about 70 percent. The hot dehydrogenation zone effluent was quenched with the condensate from the second separation step condenser. The condensate used as cooling medium was at a temperature of about 75° C. and was fed through spray nozzles to the reactor effluent. The cooled gases were then conducted to the scrubbing tower described above where they were contacted with recycled condensate from the scrubbing tower and knockout drum. The scrubbed gases were then separated in a knock-out drum. The recovered liquid had a concentration of about 30 weight percent iodine in all forms (calculated on a molecular iodine basis). The iodine solution from the knockout tank was fed to the dehydrogenation zone. The exit gases were then fed to a partial condenser where 30 mol percent of the remaining steam was condensed and about 45 mol percent of the iodine was recovered in the condensate. This condensate was cooled and used as the initial cooling medium for the hot dehydrogenation zone effluent.

Example 3

The general procedure of Example 1 was repeated with the exception that HBr was used as the halogen in an amount of 0.035 mol per mol of butene. In the second separation step about 20 mol percent of the steam was condensed and about 43 mol percent of the bromine was removed from the gaseous phase.

Example 4

The general procedure of Example 1 was repeated with the exceptions that $NH_4I$ was used as the halogen in an amount of 0.030 mol $I_2$ per mol of butene, the oxygen to butene ratio was 0.65. The maximum temperature in the dehydrogenation zone was 685° C. In the second separation zone about 59 mol percent of the remaining steam was condensed and approximately 86 mol percent of the iodine was removed from the vapor phase.

The process of this invention can be applied to a great variety of dehydrogenation processes of organic compounds. Such compounds to be dehydrogenated normally will contain from 2 to 20 carbon atoms, at least one

grouping, that is, adjacent carbon atoms each containing at least one hydrogen atom, and a boiling point below about 350° C. Such compounds may contain in addition to carbon and hydrogen, oxygen, halogens, nitrogen and sulphur. Among the classes of dehydrogenation reactions to which the present invention is applicable are the dehydrogenation with halogen and steam of alkanes, alkenes, alkyl halides, ethers, esters, aldehydes, ketones, acids, alkyl aromatic compounds, alkyl heterocyclic compounds, cyanoalkanes, cycloalkanes and the like. Illustrative dehydrogenation processes include the dehydrogenation of ethylbenzene to styrene, isopropylbenzene to α-methyl styrene, ethylcyclohexane to styrene, cyclohexane to benzene, ethane to ethylene, propane to propylene, isobutane to isobutylene, n-butane to butene and butadiene, butene to butadiene, butene or butadiene to vinyl acetylene, 2-methyl butene-2 to isoprene, 2-methyl pentene-2 to isoprene, propionaldehyde to acrolein, ethyl chloride to vinyl chloride, propionitrile to acrylonitrile, methyl isobutyrate to methyl methacrylate, ethyl pyridine to vinyl pyridine and the like. The process of this invention may be applied to other dehydrogenation processes using halogen catalysts and in the presence of steam such as the dehydrogenation of toluene, the alkyl chlorobenzenes, ethyl naphthalene, isobutyronitrile, propyl chloride, isobutyl chloride, ethyl fluoride, ethyl dichloride, butyl chloride, the chloro-fluoroethanes, methylethyl ketone, diethyl ketone, methyl propionate, and the like. The invention is preferably applied to dehydrogenation reactions wherein the dehydrogenated product contains the same number of carbon atoms as the feed compound to be dehydrogenated, but the invention is not so limited. The preferred compounds to be dehydrogenated are aliphatic hydrocarbons of 2 to 6 carbon atoms, which contain at least two adjacent carbon atoms, each of which carbon atom has at least one hydrogen atom attached. Good results have been achieved with a feed of at least about 50 to 75 mol percent of a monoethylenically unsaturated aliphatic hydrocarbon, such as the hydrocarbons of from 4 to 5 carbon atoms containing a monoethylenically unsaturated straight chain of at least four carbon atoms. Thus, butadiene-1,3 may be produced from butene-1 or butene-2 or mixtures thereof, and isoprene may be produced from any of the methyl butenes, such as 2-methyl butene-1, 2-methyl butene-2 or 2-methyl butene-3 or mixtures thereof. Isoprene may also be produced from methyl butanes, such as 2-methyl butane, also olefins and diolefins may be produced from saturated hydrocarbons such as butadiene and butene may be produced from n-butane. A mixture of monoolefins and diolefins may also be produced, such as a mixture of butadiene-1,3 and butenes from a feedstock of a mixture of n-butane and butene.

The halogens employed may be any halogen, preferably iodine, bromine or chlorine, and the form of the halogens may be the halogens themselves or any halogen-containing materials which liberate free halogen under the conditions of the reaction as defined hereinafter. Examples of suitable sources of halogen are elemental fluorine, chlorine, bromine and iodine; hydrogen chloride, hydrogen bromide and hydrogen iodide; the alkyl halides such as alkyl iodides and alkyl bromides wherein the alkyl groups preferably contain 1 to 5 carbon atoms; ammonium halides including ammonium chloride, ammonium bromide, and ammonium iodide. Mixtures of halogen sources may also be employed. Hydrogen iodide, hydrogen bromide, hydrogen chloride, ammonium iodide, ammonium bromide, ammonium chloride and alkyl iodides, bromides and chlorides of alkyl groups containing 1 to 5 carbon atoms have been found to be particularly useful as they may be recycled directly to the dehydrogenation zone by utilizing the process of this invention. The halogen may be introduced into the dehydrogenation zone or into the gases entering the dehydrogenation zone as an aqueous solution containing from 1 to 50 and preferably from about 5 to 45 weight percent halogen (calculated as $X_2$) based on the total weight of halogen and water. The water may be in liquid form or as steam.

The amount of halogen normally used may be varied; usually an amount of at least about 0.001 mol of halogen per mol of organic compound to be dehydrogenated will be used. More often, at least about 0.005 total mol of halogens per mol of organic compound to be dehydrogenated will be employed. Large amounts of halogens may be used, but normally less than about 0.2 mol of halogens, such as 0.1 mol or less, per mol of organic compound to be dehydrogenated, is used.

Steam is present in the feed to the dehydrogenation zone in an amount of at least about 2.0 mols of steam per mol of organic compound to be dehydrogenated. Generally the amount of steam will be from about 3.0 to 25 mols of steam per mol of organic compound to be dehydrogenated, although higher amounts may be employed.

The dehydrogenation zone will normally be at a temperature of reaction between 400° C. to about 850° C. or higher, such as about 1000° C. Suitable temperatures are such as from about 450° C. to 800 or 850° C. The temperature of reaction is measured at the maximum temperature in the reactor. The flow rates of the reactants may be varied quite widely and can be established by those skilled in the art. Good results have been obtained with flow rates of the compound to be dehydrogenated ranging from about 0.10 to 25, and preferably from about 0.25 to 5.0, liquid volumes of compound per volume of reaction zone, with the volumes of liquid calculated at standard conditions of 760 mm. of mercury absolute at 15.6° C. The residence or contact time of the reactants in the reaction zone under any given set of reaction conditions depends on all the factors involved in the reaction. Contact times such as from about 0.01 to about 5 or 10 seconds have been found to give excellent results. Generally, the contact time will be between about 0.1 and one second. Contact time is the calculated dwell time of the reaction mixture in the reaction zone assuming the mols of product mixture are equivalent to the mols of feed. If the reactor is unpacked, the reaction zone is defined as the portion of the reactor which is at a temperature of at least 400° C. If the reactor is packed, the reaction zone is defined as the volume of reactor containing packing.

Diluents such as nitrogen, carbon dioxide or hydrocarbons may be included to reduce the partial pressure of the compound or compounds to be dehydrogenated to less than equivalent to about 10 or 15 inches of mercury absolute at a total pressure of one atmosphere. The steam used in the dehydrogenation process may be used as the sole means of reducing the partial pressure of the compound to be dehydrogenated, or a combination steam together with a diluent such as nitrogen may be employed. The lower limit of the partial pressure of the compound to be dehydrogenated is not critical but from an economic standpoint will be at least greater than 0.1 inch of mercury absolute.

As stated above, the pressure of the hydrocarbon feed may be equivalent to less than 10 or 15 inches of mercury at one atmosphere total pressure. For example, in a mixture of one mol of butene, three mols of steam and one mol of oxygen under a total pressure of one atmosphere the butene would have an absolute pressure of one-fifth of the total pressure, or roughly six inches of mercury absolute pressure. Equivalent to this six inches of mercury butene absolute pressure with the system at atmospheric pressure would be pure butene under a vacuum such that the total pressure is six inches of mercury absolute. For the purpose of this invention, also equivalent to the six inches of mercury butene absolute pressure with the system at atmospheric pressure, would be the same mixture of one mol of butene, three mols of steam and one mol of oxygen under a total pressure greater than atmospheric, for example, a total pressure of 15 inches mercury above atmospheric. Thus, when the total pressure on the reaction zone is greater than one atmosphere, the absolute values for the pressure of butene will be increased in direct proportion to the increase in total pressure above one atmosphere.

The oxygen may be supplied by any source such as pure oxygen or as air. The amount of oxygen will normally be in the range of about 0.25 mol of oxygen to 1.5 or 2.5 mols of oxygen per mol of hydrocarbon to be dehydrogenated. As high as 5 mols of oxygen and higher have been employed. In relation to the total halogen, the amount of oxygen employed will usually be greater than 1.25 mols of oxygen per atom of halogen and normally will be greater than 5.0 or 10.0 mols of oxygen per atom of halogen. Usually the ratio of mols of oxygen to atoms of halogen will be from about 2 to 300 with the best results having been obtained at ratios between about 3 and 100 mols of oxygen per atom of halogen.

The process may be conducted in the absence of contact catalysts, but better results are obtained if the reaction is conducted in the presence of catalysts containing metal atoms of Groups I$a$, I$b$, II$a$, II$b$, III$a$, III$b$, IV$a$, IV$b$, V$a$, V$b$, VI$b$, VII$b$, VIII$b$ and the rare earth elements. The preferred catalysts are compounds of elements of Groups I$a$, II$a$, II$b$, III$b$, IV$a$, IV$b$, V$a$, V$b$, VI$b$, VII$b$, VIII$b$ and mixtures thereof. These groups are based on the Periodic Table as found in Smith's Introductory College Chemistry, Third Edition, by William F. Ehret, copyright 1950, by Appleton-Century-Crofts, Inc. These metal atoms may conveniently be present in the forms of the elemental metal, metal oxides, metal hydroxides, metal salts, such as the halides, or metal compounds which will be converted to these forms under the conditions of reaction. Examples of catalysts would be potassium oxide, magnesium oxide, lanthanum oxide, titanium dioxide, vanadium pentoxide, chromous oxide, manganese dioxide, ferric oxide, cobaltic chloride, nickel phosphate, cuprous phosphate, zinc phosphate, stannic phosphate and bismuth trioxide.

When reference is made in the specification and claims to a quantity of halogen or inorganic halogen, this refers to the total halogen present in any form and the quantity stated is calculated as the equivalent weight of mols of elemental halogen, regardless of whether the halogen is in elemental form or is present as a compound, unless expressed otherwise such as by reference to a quantity of a particular halogen compound.

We claim:

1. An improved dehydrogenation process which comprises (1) heating in a dehydrogenation zone at a temperature of at least 400° C. a mixture of a dehydrogenatable organic compound containing 2 to 6 carbon atoms, having at least one

and a boiling point below about 350° C., steam, and halogen to form a gaseous dehydrogenation zone effluent at a temperature of greater than 400° C.; (2) quenching the dehydrogenation zone effluent with an aqueous halogen solution comprising from about 0.001 to 10 weight percent halogen to form a quenched effluent mixture; (3) separating the quenched effluent into a gaseous phase and a liquid solution of halogen, said liquid solution containing at least 50 mol percent of the inorganic halogen originally present in the gaseous dehydrogenation zone effluent, and said liquid solution further containing from 10 to 50 weight percent halogen based on the total weight of the solution, said gaseous phase containing steam, the unsaturated organic compound and the remainder of the halogen; (4) condensing from about 15 to 80 mol percent of the steam contained in the gaseous phase resulting from step (2) to form a condensate containing halogen in solution, said condensate containing from about 0.001 to 10 weight percent halogen, with the ratio of the mols of halogen contained in the said condensate to the mols of halogen remaining in the vapor phase being at least 10 percent greater than the ratio of the mols of steam condensed to the mols of steam remaining in the vapor phase; (5) using the condensate from step (4) as the quench solution for the reactor effluent according to step (2); and (6) separating the unsaturated organic product from the gaseous phase of step (4).

2. The process of claim 1 wherein the organic compound is a hydrocarbon of 4 to 5 carbon atoms, at least 2 mols of steam per mol of the said organic compound are present, the quenching solution is an aqueous solution containing from about 0.01 to 10 weight percent halogen, and contains from 10 to 45 percent of the inorganic halogen originally present in the gaseous dehydrogenation zone effluent, and the condensate contains from 0.01 to 10 weight percent halogen.

3. The process of claim 2 wherein the dehydrogenatable compound is a hydrocarbon of 2 to 6 carbon atoms, the quenching solution is an aqueous halogen solution comprising from about 0.01 to 5 weight percent halogen, the aqueous liquid solution comprises 80 mol percent of the inorganic halogen originally present in the dehydrogenation zone, and the condensate contains from about 0.01 to 5 weight percent halogen.

4. The process of claim 1 wherein the dehydrogenatable compound is an aliphatic hydrocarbon of 2 to 6 carbon atoms, the quenched effluent mixture in step (3) is passed through a pressure drop zone having a restricted cross sectional area, the quenched effluent which is passing through the restricted cross sectional area is contacted with an aqueous contacting liquid to form a scrubbed mixture, the pressure drop across the restricted cross sectional area being at least 15 inches of water; and wherein the aqueous liquid solution separated from the scrubbed mixture contains at least 60 mol percent of the inorganic halogen originally present in the gaseous dehydrogenation effluent.

5. The process of claim 4 wherein the pressure drop across the restricted cross sectional is at least about 25 inches of water; the aqueous liquid solution contains from 80 to 99 mol percent of the halogen originally present in the dehydrogenation effluent, and wherein a portion of the aqueous liquid solution containing 10 to 45 weight percent halogen is used as contacting liquid in the pressure drop zone, and the remaining portion of the aqueous liquid solution is fed to the dehydrogenation zone as a source of halogen.

6. The process of claim 5 wherein the halogen is selected from the group consisting of chlorine, bromine, and iodine.

7. The process of claim 5 wherein the hydrocarbon feed contains n-butane, n-butene, and mixtures thereof, the halogen is supplied as ammonium bromide, and the quenching liquid and aqueous liquid solutions contain ammonium bromide.

8. An improved process for the production of butadiene 1,3 which comprises (1) heating in a dehydrogenation zone at a temperature of at least 400° C. a mixture of a hydrocarbon feed selected from the group consisting of n-butane, n-butene and mixtures thereof, at least 2 mols of steam per mol of said hydrocarbon, oxygen and halogen to form a gaseous dehydrogenation zone effluent at a temperature of greater than 400° C.; (2) quenching the dehydrogenation zone effluent with an aqueous halogen solution comprising from about 0.01 to 10 weight percent halogen to form a quenched effluent mixture; (3) separating the quenched effluent into a gaseous phase and an aqueous liquid solution of halogen, said aqueous liquid solution containing at least 50 mol percent of the inorganic halogen originally present in the gaseous dehydrogenation zone effluent, and said aqueous liquid solution further containing from 10 to 45 weight percent halogen based on the total weight of the solution, said gaseous phase comprising steam, butadiene and the remainder of the halogen; (4) condensing from about 15 to 80 mol percent of the steam contained in the gaseous phase resulting from step (2) to form a condensate containing halogen in solution, said condensate containing from about 0.01 to 10 weight percent halogen, the ratio of the mols of halogen contained in the said condensate to the mols of halogen remaining in the vapor phase being at least 10 percent greater than the ratio of the mols of steam condensed to the mols of steam remaining in the vapor phase; and (5) using the condensate from step (4) as the quench solution for the reactor effluent according to step (2); and (6) separating the butadiene from the gaseous phase of step (4).

9. An improved process for the production of unsaturated hydrocarbons which comprises (1) heating in a dehydrogenation zone at a temperature of at least 400° C. a mixture of a hydrocarbon to be dehydrogenated, at least about 4 mols of steam per mol of said hydrocarbon, oxygen, and at least 0.001 mol of halogen per mol of said hydrocarbon to form a gaseous dehydrogenation zone effluent at a temperature of greater than 400° C.; (2) quenching the dehydrogenation zone effluent with an aqueous halogen solution comprising from about 0.01 to 5 weight percent halogen to form a quenched effluent mixture; (3) intimately scrubbing the quenched effluent mixture with an aqueous scrubbing solution of halogen containing from 10 to 45 percent by weight halogen to form a scrubbed mixture; (4) separating the scrubbed mixture into a gaseous phase and an aqueous liquid solution of halogen, said aqueous liquid solution containing from at least 80 mol percent of the inorganic halogen originally present in the gaseous dehydrogenation zone effluent, and said aqueous liquid solution further containing from 10 to 45 weight percent halogen based on the total weight of the solution, said gaseous phase containing steam, the unsaturated hydrocarbon and the remainder of the halogen; (5) feeding a portion of the said aqueous liquid solution of (4) containing from 10 to 45 weight percent halogen as the scrubbing solution of (3); (6) feeding the remaining portion of the said aqueous liquid solution of (4) containing from 10 to 45 weight percent halogen to the said dehydrogenation zone (1) as the source of halogen; (7) condensing from about 15 to 80 mol percent of the steam contained in the gaseous phase resulting from step (4) to form a condensate containing halogen in solution, and a vapor phase comprising the unsaturated hydrocarbon and steam, said condensate containing from about 0.01 to 5 weight percent halogen, the ratio of the mols of halogen contained in the said condensate to the mols of halogen remaining in the vapor phase being at least 10 percent greater than the ratio of the mols of steam condensed to the mols of steam remaining in the vapor phase; (8) using the condensate from step (7) as the quench solution for the reactor effluent according to step (2); and (9) separating the unsaturated hydrocarbon product from the gaseous phase of step (7).

10. The process of claim 9 wherein the hydrocarbon is an aliphatic hydrocarbon of 2 to 6 carbon atoms, having at least two adjacent carbon atoms, each of which carbon atoms has at least one hydrogen attached, and the aqueous liquid solution of halogen separated after scrubbing contains from at least 80 to about 99 mol percent of the halogen originally present in the dehydrogenation zone effluent.

References Cited
UNITED STATES PATENTS

| | | | |
|---|---|---|---|
| 2,921,101 | 1/1960 | Magovern | 260—680 |
| 3,049,574 | 8/1962 | Johnson | 260—666 |
| 3,207,805 | 9/1965 | Gay | 260—680 |
| 3,207,806 | 9/1965 | Bajars | 260—680 |

PAUL M. COUGHLAN, JR., *Primary Examiner.*

U.S. Cl. X.R.

260—681.5